Sept. 12, 1933.  T. A. MILLER  1,926,345
TIRE BUILDING DRUM
Filed Nov. 25, 1930  3 Sheets-Sheet 1
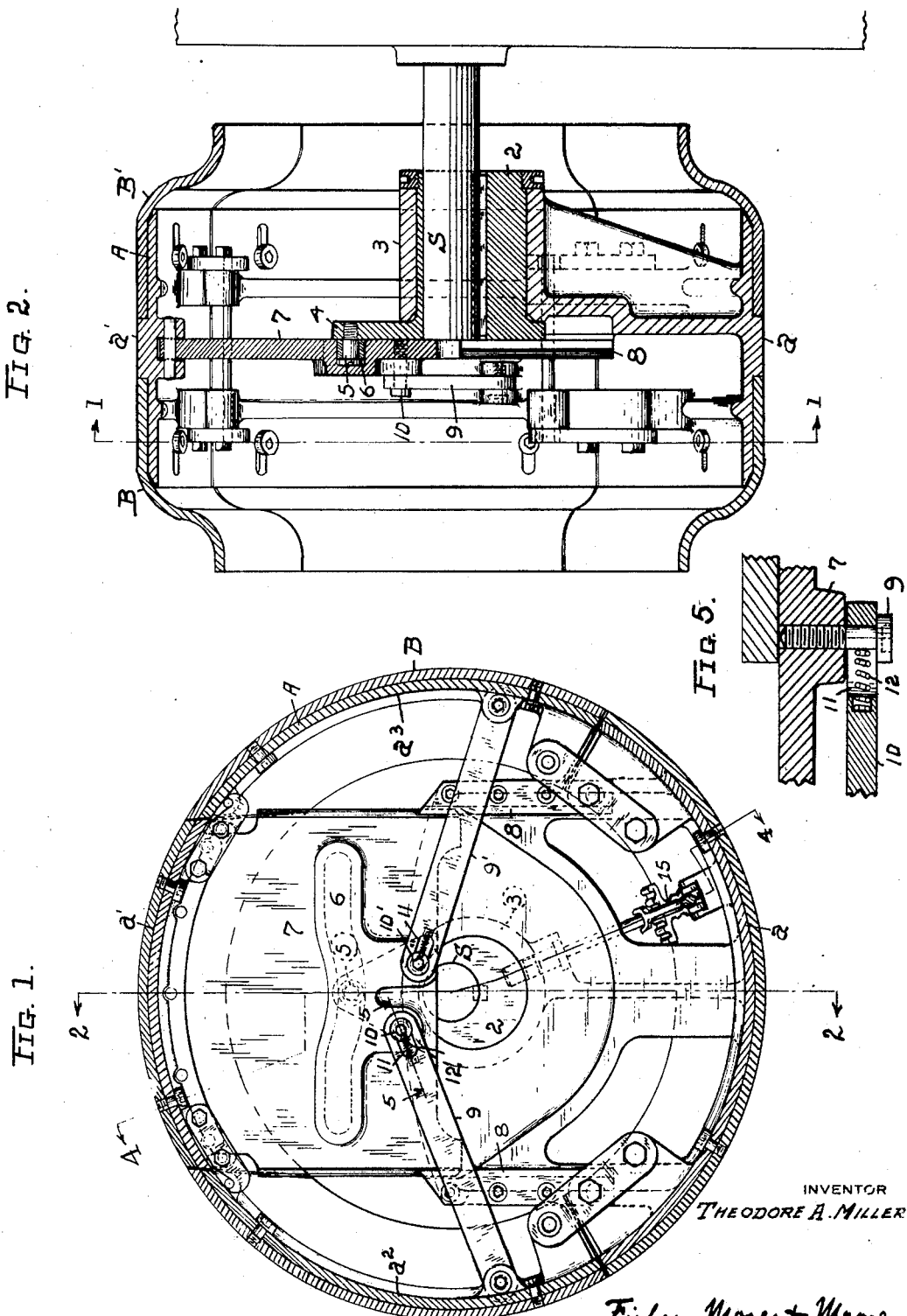
INVENTOR
THEODORE A. MILLER
Fisher, Moser & Moore
ATTORNEYS.

Sept. 12, 1933.  T. A. MILLER  1,926,345
TIRE BUILDING DRUM
Filed Nov. 25, 1930  3 Sheets-Sheet 2
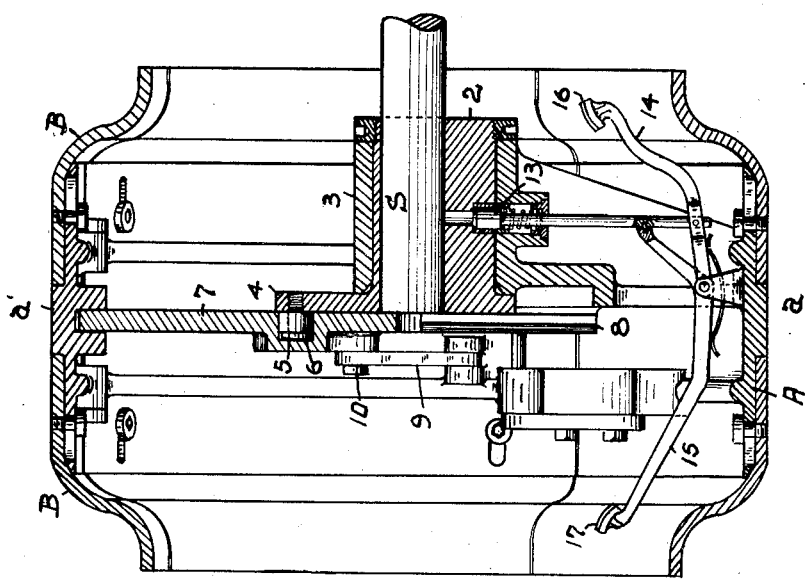
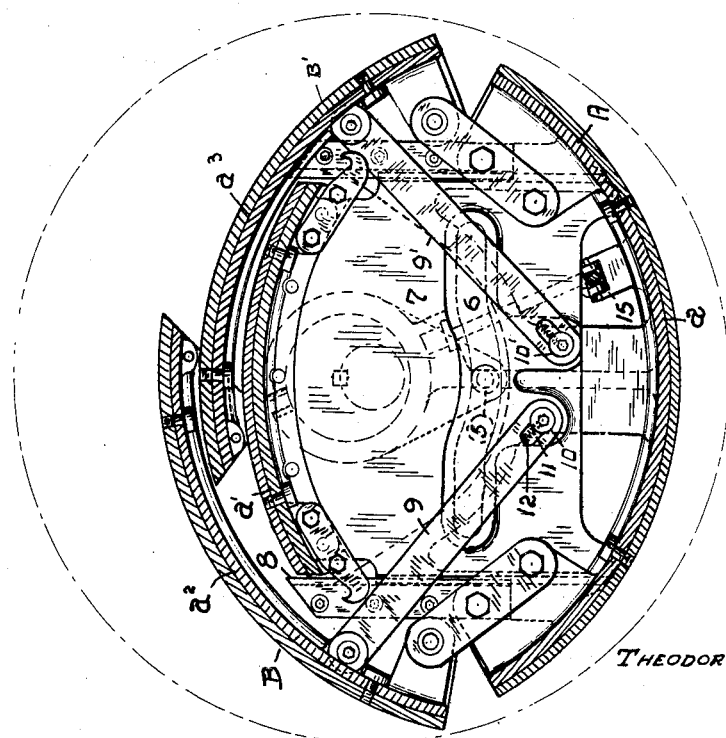
INVENTOR
THEODORE A. MILLER.
Fisher, Moser & Moore
ATTORNEYS.

Sept. 12, 1933.    T. A. MILLER    1,926,345
TIRE BUILDING DRUM
Filed Nov. 25, 1930    3 Sheets-Sheet 3
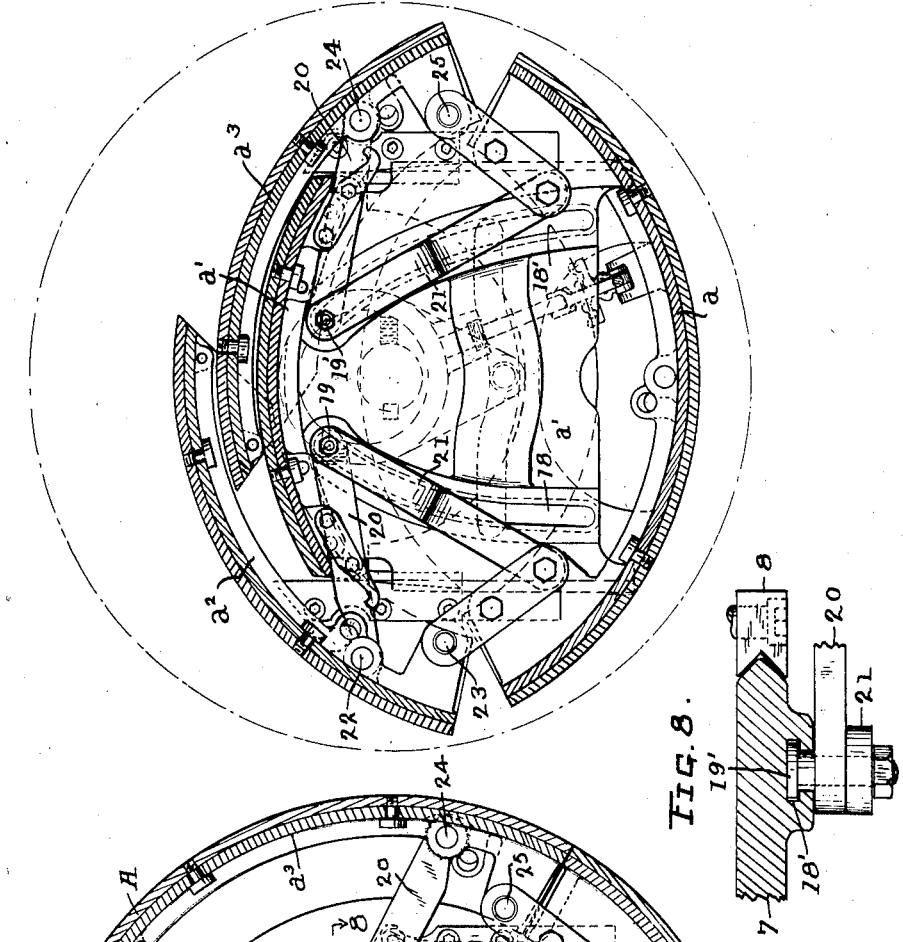
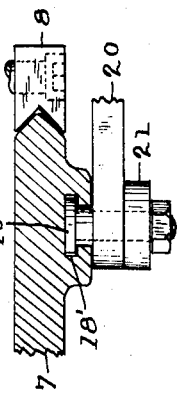
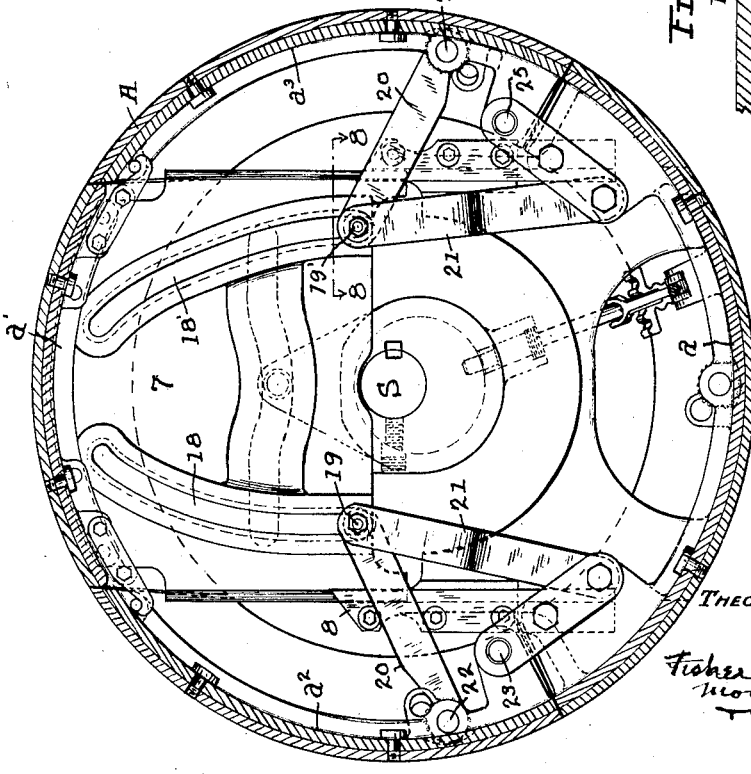
INVENTOR
THEODORE A. MILLER
ATTORNEYS.

Patented Sept. 12, 1933

1,926,345

UNITED STATES PATENT OFFICE 1,926,345

TIRE BUILDING DRUM

Theodore A. Miller, Akron, Ohio, assignor to National Rubber Machinery Company, Akron, Ohio, a corporation of Ohio Application November 25, 1930
Serial No. 498,035

33 Claims. (Cl. 154—9)

The present invention relates to tire building drums, and is a continuation in part of my application for patent filed January 18, 1930, Serial No. 421,751. In general the purpose of the invention is to provide a collapsible drum adapted to be contracted to considerably smaller dimensions than the drum shown in said application, whereby certain kinds of automobile tires may be built on the drum and then readily removed therefrom. Thus, in making some tires the cross-sectional shape and contour is such that the beaded portions are of considerably smaller diameter than the tread portions of the tire and therefore difficult to strip off and remove from the periphery of the tire-building drum unless the drum sections are collapsed together very compactly. With the present improvement each and every section of the drum is collapsed or moved inwardly toward the axis and brought into very close relation to facilitate the removal of such tires from the drum, all substantially as hereinafter described and more particularly pointed out in the claims.

In the accompanying drawings, Fig. 1 is a side elevation and sectional view of a drum embodying my improvement, this view being taken on line 1—1 of Fig. 2, whereas Fig. 2 is a sectional view centrally of the drum on line 2—2 of Fig. 1. Fig. 3 is a sectional view corresponding to Fig. 1, but showing the drum fully collapsed or contracted. Fig. 4 is a sectional view of the drum on line 4—4 of Fig. 1. Fig. 5 is a sectional view of one of the link connections. Figs. 6 and 7 are sectional views corresponding to Figs. 1 and 3, respectively, but showing a modified form of the invention. Fig. 8 is a sectional view on line 8—8 of Fig. 6.

The present drum is adapted to be mounted on a rotatable power-shaft S forming part of a tire-builidng machine and to be collapsed and expanded automatically and controlled by an operator in substantially the same way as set forth in my companion application. In addition, all four drum sections $a$, $a'$, $a^2$, and $a^3$, respectively, are adapted to be collapsed and moved inwardly toward the shaft, thereby bringing all said parts much closer together.

Thus, the drum comprises an annular body or main ring A which is divided into four arcuate sections consisting of a driving section $a$, a slidable section $a'$, arranged diametrically opposite said driving section $a$, and a pair of hinged sections $a^2$ and $a^3$, respectively, pivotally connected to the opposite ends of driving section $a$.

Complementary rim sections B—B' are secured adjustably and detachably to the four sections of the main body or ring A, thereby providing a circular drum upon which to build a tire of a given contour or shape, or desired construction. But it should be understood that before vulcanizing and completing the tire it is removed from the drum and re-shaped by other steps following well known practices.

Now the shape of the tire may also be a shape offering difficulties in removing the tire from a tire-building drum. To foster all these things, the present drum may be contracted or collapsed to a maximum extent by moving the driving section $a$ inwardly toward the axle in addition to collapsing the other three sections inwardly. A desirable way of effecting that result is to mount driving section $a$ rotatably upon an eccentric 2 keyed to power-shaft S. Normally the drum is locked to the shaft so that it will rotate therewith in tire-building operations, but when the drum is unlocked and held stationary during one-half of a revolution of the shaft, the driving section $a$ will be caused to move inwardly toward the shaft, inasmuch as eccentric 2 will then revolve within its bearing 3, which bearing forms an integral part of driving section $a$. At the same time a crank member 4 forming a fixed part of eccentric 2 or shaft S operates to draw the second ring section $a'$ inwardly toward the axle, the said crank member having a roller 5 operating in a transverse channel or cam groove 6 in a supporting slide 7 for the said section. Slide 7 is supported between spaced guide-ways 8 carried by driving section $a$, and as coupled together these two sections are adapted to slide in opposite directions in respect to each other and eccentric 2. During one-half of a revolution of eccentric 2, the two sections $a$ and $a'$ move toward shaft S, but in unequal degree; that is, the slide section $a'$ moves inwardly a greater distance than driving section $a$. But their combined movement inwardly brings the arcuate ring sections closer together than if a movement inwardly was imparted to only one of them. Also, the hinged sections $a^2$ and $a^3$ which are pivotally connected to driving section $a$ are shifted bodily in respect to slide section $a'$ to such an appreciable extent that they may be collapsed inwardly into overlapping relationship around slide $a'$, see Fig. 3. The devices for collapsing the hinged sections $a^2$ and $a^3$ are also arranged to cause one of them to collapse inwardly in advance of the other, and vice versa in expanding movements. Thus, two links 9 and 9', respectively, connect the hinged sections $a^2$ and $a^3$ with slide 7, and the connecting bolts or pins 10—10' for the links are offset or situated different distances from the medial line of the drum to produce a differential movement for the hinged sections in collapsing and expanding operations. Various ways of coupling the links to the slide may be adopted to obtain the desired results, including an idle movement or a time lag in movements, whereby the slide section $a'$ may disengage itself from the hinged sections $a^2$ and $a^3$ in contracting or collapsing operations, and then in expanding the sections cause the hinged sections to move outwardly their maximum distance to a true circle before the slide section $a'$ reaches its place to complete the ring. The links are slotted at 11 where coupled to the pivot pins 10—10', and the links inclined in respect to the axis of the drum so that the desired time lag may be effected. Compression springs 12 are also employed in the slots 11 to provide a yielding connection between the links and their pivot pins, whereby the hinged sections may be caused to expand promptly when the drum is expanded and without causing undue or undesirable lost motion between the parts.

The means for locking the drum to the eccentric 2 and shaft S comprises a spring-pressed locking bolt 13 which may be withdrawn by a pivoted lever 14, and a second pivoted lever 15 is also provided to lock bolt 13, see Fig. 4. These levers have hand or finger grips 16 and 17, respectively, situated near the rims of the drum where the operator may grasp them and the drum while the drum is stationary. The operator is then in control and can unlock the drum from the shaft, and cause the power shaft to make one-half of a revolution, it being understood that automatic or manually-controlled clutches and/or electric switches are employed to control the rotatable movements of the shaft and drum. A one-half revolution of the power shaft collapses the drum sections inwardly to the compact state delineated in Fig. 3, and permits the tire to be easily removed. The locking bolt is retired at this time so that whenever the operator starts the tire machine, it will revolve the crank and eccentric and complete the cycle of rotation to lock the drum automatically to the shaft without any special attention on the part of the operator. When so locked the drum will revolve with the shaft, and tire building operations may proceed. The expanding of the drum is facilitated by the unbalanced weight of the drum sections on the shaft, which retards rotation of drum as the shaft starts rotating.

In Figs. 6 to 8, I show a drum corresponding in general to the drum hereinbefore described, excepting that a modified form of link movement is provided therein for collapsing and expanding the hinged sections $a^2$ and $a^3$ in a more positive manner and progressively without interfering with each other. Thus, in this instance slide $a'$ is formed with a pair of cam grooves 18—18' extending lengthwise thereof at opposite sides of its longitudinal medial line. These cam grooves differ in shape but each provides a rabbeted or shouldered guide way in which flanged pins or rollers 19—19' may travel within limits. Each pin or roller is pivotally connected to the corresponding ends of a pair of links 20 and 21, respectively, and the opposite ends of these links are connected to a hinged side section and the drive section $a$ of the drum. Two sets of links are used to collapse and expand the separate hinged side sections $a^2$ and $a^3$ progressively, and the pivoted connection 22 for the link 20 for hinged section $a^2$ is preferably located nearer the fulcrum 23 for that section than the link pivot 24 for section $a^3$ is to its fulcrum 25. This arrangement of the link pivots together with the cam grooves produces differential movements of the hinged sections $a^2$ and $a^3$ whereby these particular sections will be collapsed into overlapping relation and also expanded without interference when the driving section $a$ and slidable sections $a'$ are reciprocated relatively to the main supporting shaft. In such movements of the parts the links 21—21 act as swinging supports for the inner ends of the operating links 20—20 and for rollers 19—19', and the cam grooves in slide $a'$ act on links 20—20 to swing the hinged sections $a^2$ and $a^3$ back and forth in a positive manner but at different times and in different degree.

What I claim, is:

1. In a collapsible tire-building drum, a power-driven shaft, adapted to be rotated intermittently, a ring of collapsible tire building sections mounted to rotate independently upon said shaft, means for locking said sections releasably to said shaft, and means for collapsing all said sections conjointly upon effecting relative rotation between said sections and shaft.

2. A collapsible tire-building drum, comprising a rotatable support, a ring of collapsible sections rotatable independently of said support, means including a crank and an eccentric for collapsing and expanding said sections upon producing relative rotation between said ring and support, and means for uniting said ring to said rotatable support when its sections are expanded.

3. A collapsible tire-building drum, comprising a rotatable eccentric and crank member, a ring of collapsible sections operatively connected to and rotatable independently of said member whereby all of said ring sections are caused to move bodily toward the axis of the drum, and means for locking said member and one of said sections releasably together.

4. A collapsible tire-building drum, comprising a divided ring which includes a pair of slidably related sections and a pair of hinged sections, together with means for moving all four sections bodily inwardly toward the axis of the drum.

5. A collapsible tire-building drum, comprising a revoluble eccentric and crank, a sectional ring revolubly-related to said eccentric and crank, separate slidable ring sections operatively connected to said eccentric and crank, and a pair of pivoted ring sections connected to one of said slidable sections.

6. In a collapsible tire-building drum, a pair of slidable ring sections, a pair of ring sections pivotally connected to one of said slidable sections, a combined eccentric and crank in actuating connection with said slidable section, links coupling said pivoted sections to one of said slidable sections, and controllable means for producing either collapsible movements or conjoint rotative movements of said sections.

7. A collapsible tire-building drum, comprising a revoluble eccentric and crank member, a driving ring section rotatably connected with said eccentric, means for locking said section releasably to said eccentric, a slidable ring section mounted on said driving section, a pair of ring sections pivotally connected to said driving section, links connecting said pivoted sections with said slidable section, and said slidable section having an operating connection with said crank member.

8. A collapsible tire-building drum, comprising a revoluble shaft, a ring divided into arcuate sections mounted to rotate independently of said shaft, means operatively connected with said shaft for drawing two of said sections toward the shaft when relative rotation is produced between said shaft and sections, means coupling the remaining sections to said first sections to collapse the same in overlapping relation, and controllable means for producing conjoint rotation of said shaft and sections when the sections are expanded.

9. A collapsible tire-building drum, comprising a revoluble eccentric and crank member; a sectional ring adapted to rotate independently of said member, said sectional ring having one section therein rotatably coupled to said eccentric, and a second section coupled to said crank member and including a pair of hinged sections linked yieldably to one of the first named sections, in combination with manually controllable means for locking one of said ring sections to said revoluble member.

10. A collapsible tire-building drum, comprising a revoluble eccentric and crank member; a sectional ring having one section therein rotatably coupled to said eccentric, a second section coupled to said crank member, a pair of hinged sections pivotally connected to one of said sections; means for effecting differential collapsing movements of said hinged sections; and means for locking one of said ring sections releasably to said crank member.

11. In a collapsible tire-building drum, a sectional ring adapted to be collapsed to smaller dimensions, comprising a pair of slidably-related sections, a second pair of sections hinged to one of said slidably-related sections, and means for producing relative movements between said slidably-related sections, including separate cam and link devices for producing differential collapsible movements between said hinged sections.

12. The combination in a radially collapsible form of relatively movable members for supporting all the form sections, one of said members comprising a power actuated shaft, means for holding said other member against rotation with the shaft, and connections between said members and the form sections for radially collapsing all the form sections when the shaft is power actuated while the said other member is held, said holding means permitting indeterminate rotation of said shaft.

13. The combination in a radially collapsible form of relatively movable members for supporting all the form sections, said form sections being arranged with opposite slidable sections and opposite pivoted sections supported by a slidable section, one of said members comprising a power actuated shaft, means for holding said other member against rotation with the shaft, and connections between said members and the form sections for radially collapsing all the form sections when the shaft is power actuated while the other member is held, said holding means permitting indeterminate rotation of said shaft.

14. A collapsible tire-building drum, including a rotatable shaft, a set of collapsible ring-shaped sections revolubly mounted on said shaft, and means for collapsing and expanding said sections operable by producing relative rotation between said sections and shaft, said drum being unbalanced on said shaft to retard relative rotation between said drum and shaft when said sections are being expanded.

15. A collapsible tire-building drum, including an intermittently-operated power-driven shaft, a set of pivotally collapsible ring-shaped tire building sections mounted to rotate independently or conjointly with said shaft, and means operable by effecting relative rotation between said sections and shaft for collapsing said sections.

16. A collapsible tire-building drum, including a rotatable support, collapsible pivoted ring sections mounted for independent rotation on said support, and crank means for operating said collapsible sections upon producing relative rotation between said sections and support.

17. A collapsible tire-building drum, comprising a rotatable drum supporting shaft and crank member, collapsible ring sections operatively connected to said crank member, said sections being rotatable independently of said shaft and crank member, and means for locking said crank member and sections releasably together.

18. A collapsible tire-building drum, including a pair of sections hinged to a rotatable driving section, and a revoluble drum supporting shaft having means for operating said collapsible sections, said driving section being rotatable independently of said shaft.

19. A collapsible tire-building drum, comprising a revoluble shaft, a set of collapsible ring-shaped sections, a slidable member linked to said collapsible sections, a crank member operatively connected to said shaft and slidable member, a rotatable support for said sections, and means for locking said crank member and rotatable support together.

20. A collapsible tire-building drum, comprising a revoluble shaft and crank, a main ring section revolubly-related to said crank, a slidable ring section operatively connected to said crank, and a pair of hinged ring sections supported on said main section in operable connection with said slidable section.

21. A collapsible tire-building drum, comprising a rotatable ring section, a slidable ring section and a pair of collapsible ring sections mounted upon said rotatable ring section, a revoluble shaft and cam means for reciprocating said slidable section, and means for producing conjoint rotation of said sections instead of reciprocal movements of said slidable section.

22. A collapsible tire-building drum, including a revoluble shaft, a set of collapsible ring sections rotatable independently of said shaft, controllable means for producing conjoint revolutions of said ring sections and said shaft, and means coupled with said shaft for collapsing and expanding said ring sections when said controllable means is operated to permit relative revolution between said shaft and said sections.

23. A collapsible tire-building drum, including a pair of ring sections slidably related, a pair of collapsible ring sections pivotally connected to one of the first pair of sections, a drum-supporting shaft, a crank member for operating said sections rotatable about the shaft, and controllable means for locking and unlocking said sections and crank member for independent or conjoint rotative movements.

24. A collapsible tire-building drum, comprising a revoluble shaft and crank member, a driving ring section rotatably connected with said shaft, a slidable ring section mounted on said driving section, a pair of collapsible ring sections pivotally connected to said driving section, links connecting said collapsible sections with said slidable section, said slidable section having a cam groove adapted to co-act with said crank member, and controllable means for locking said driving section to said crank member.

25. A collapsible tire-building drum, comprising a revoluble shaft, a series of collapsible sections mounted to rotate independently of said shaft, means operatively connected with said shaft and collapsible sections for collapsing and expanding the same when relative rotation is produced between said shaft and sections, controllable means for producing conjoint rotation of said shaft and sections when the sections are expanded, and each of said sections having supplemental tire-building ring sections detachably affixed thereto.

26. A collapsible tire-building drum, comprising a sectional inner ring, complementary outer ring sections secured replaceably upon the sections of said inner ring, means for collapsing and expanding the connected ring sections, power-driven means for operating said collapsing means, and hand grip devices mounted upon one of the ring sections for releasably connecting one of said ring sections with said power-driven means.

27. A collapsible tire-building drum, comprising a revoluble shaft and a crank member, a sectional ring adapted to rotate independently of said shaft and crank member, a slidable ring section and a pair of hinged ring sections loosely linked together, said slidable ring section having a cam groove in which said crank member is adapted to operate, means for locking said sections rigidly together when expanded, and manually operable means for releasably locking one of said ring sections to said cam member.

28. In a collapsible tire building form, a plurality of sections constituting the form, certain of said sections being movable toward the axis of the form to contract the same, a form supporting and rotating shaft, said shaft being rotatable independently of the form, and a connection between the shaft and the form operable to cause radial contraction of the form upon independent rotation of the shaft.

29. A tire building form including a power driven shaft, a set of segments constituting the outer periphery of the form, a sleeve on the shaft mounted to operate independently or conjointly with the shaft, and means operable by effecting a single relative rotation of the shaft and sleeve for contracting the segments radially of the form sufficiently to permit the removal of the tire therefrom.

30. The combination in a radially collapsible form of relatively movable members for operating a plurality of form sections, one of said members comprising a power actuated shaft, said other member being adapted to be held against rotation with said shaft, and connections between said members and the form sections for radially collapsing the same when said shaft is power driven while said other member is held, said other member being adapted to permit indeterminate rotation of said shaft when the form is collapsed.

31. A tire building form including a plurality of segments radially collapsible to permit removal of a tire from the form, means for supporting and rotating said form including rotatable members adapted to rotate in unison or relative to each other and to support the form in expanded position, both in a state of rest and while rotating, connections between said members and the form for radially collapsing the form whereby a tire may be removed therefrom and also for expanding the form after removal of the tire upon relative rotation of said members, and power means for rotating said members in unison and also for causing relative rotation thereof when rotation of one of said members is hindered, whereby said form may be collapsed and expanded by power.

32. A tire building form including a plurality of segments radially collapsible, means for supporting and rotating said form including rotatable members adapted to rotate either in unison or relatively and to support the form in expanded condition in a state of rest as well as in motion, connections between said members and said form for collapsing the same upon relative rotation of said members, and power means for rotating said members in unison and also operable to cause relative rotation of said members upon hindering rotation of one of said members, whereby said form is collapsed by power.

33. A tire building form including a plurality of segments collapsible inwardly of the form and certain of which are pivoted to swing inwardly during collapsing of the form, means for supporting and rotating said form including members rotatable either in unison or relatively and adapted to support the form in expanded condition in a state of rest, as well as in motion, connections between said members and said pivoted segments for swinging said pivoted segments inwardly upon relative rotation of said members, and power means for rotating said members in unison and operable when rotation of one of said members is hindered to produce relative rotation of said members, whereby said form is collapsed by power.

THEODORE A. MILLER.